(12) United States Patent
Ogino et al.

(10) Patent No.: US 6,621,251 B2
(45) Date of Patent: Sep. 16, 2003

(54) PHASE VOLTAGE CONTROLLED VOLTAGE REGULATOR OF VEHICLE AC GENERATOR

(75) Inventors: Toshiyo Ogino, Okazaki (JP); Makoto Taniguchi, Kariya (JP); Koji Tanaka, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/922,690

(22) Filed: Aug. 7, 2001

(65) Prior Publication Data

US 2002/0021111 A1 Feb. 21, 2002

(30) Foreign Application Priority Data

Aug. 8, 2000 (JP) .......................................... 2000-239918
May 15, 2001 (JP) .......................................... 2001-144937

(51) Int. Cl.$^7$ ........................... H02H 7/06; H02P 11/00; H02P 9/00
(52) U.S. Cl. ........................................... 322/28; 322/17
(58) Field of Search ..................................... 322/28, 17

(56) References Cited

U.S. PATENT DOCUMENTS

| | | | |
|---|---|---|---|
| 4,143,289 A | 3/1979 | Williams | 310/156 |
| 4,297,631 A | 10/1981 | Nicol et al. | 320/64 |
| 4,495,450 A * | 1/1985 | Tokizaki et al. | 318/138 |
| 4,585,982 A * | 4/1986 | Cooper et al. | 318/723 |
| 4,641,066 A * | 2/1987 | Nagata et al. | 318/254 |
| 4,730,097 A * | 3/1988 | Campbell et al. | 219/203 |
| 4,739,244 A * | 4/1988 | Komurasaki et al. | 322/29 |
| 4,743,777 A * | 5/1988 | Shilling et al. | 290/46 |
| 4,743,815 A * | 5/1988 | Gee et al. | 318/254 |
| 4,751,629 A * | 6/1988 | Shimizu et al. | 363/37 |
| 5,093,583 A * | 3/1992 | Mashino et al. | 307/10.1 |
| 5,097,195 A * | 3/1992 | Raad et al. | 322/10 |
| 5,182,511 A | 1/1993 | Pierret et al. | 324/158 MG |
| 5,345,156 A * | 9/1994 | Moreira | 318/254 |
| 5,376,876 A | 12/1994 | Bauser et al. | 322/28 |
| 5,426,578 A * | 6/1995 | Nakamura et al. | 363/37 |
| 5,444,592 A * | 8/1995 | Shimizu et al. | 361/21 |
| 5,449,999 A | 9/1995 | Edwards | 322/28 |
| 5,493,202 A | 2/1996 | Iwatani et al. | 322/28 |
| 5,495,162 A * | 2/1996 | Rozman et al. | 322/10 |
| 5,602,470 A | 2/1997 | Kohl et al. | 324/177 |
| 6,147,474 A | 11/2000 | Koss et al. | 322/59 |
| 6,215,261 B1 * | 4/2001 | Becerra | 318/254 |

FOREIGN PATENT DOCUMENTS

| | | |
|---|---|---|
| EP | 0 510 527 A1 | 10/1992 |
| JP | 5083998 | 4/1993 |
| JP | 6284598 | 10/1994 |

* cited by examiner

Primary Examiner—Thomas M. Dougherty
Assistant Examiner—Pedro J. Cuevas
(74) Attorney, Agent, or Firm—Oliff & Berridge, PLC (57) ABSTRACT

A voltage regulator of a vehicle AC generator includes a rotor having a plurality of magnetic poles, a field coil for polarizing magnetic poles, an armature having an armature core with a plurality of phase windings for generating AC voltage under the influence of rotating magnetic field provided by the rotor and a full-wave rectifier for converting the AC voltage into DC voltage. The voltage regulator is comprised of a circuit for detecting phase voltage of one of the phase windings, and a comparator for comparing the phase voltage with a variable threshold level formed from the phase voltage and providing an output signal. Even if the phase voltage is biased by a DC bias voltage due to leak in the armature, the rotation of the rotor can be detected.

17 Claims, 12 Drawing Sheets

PHASE VOLTAGE CONTROLLED VOLTAGE REGULATOR OF VEHICLE AC GENERATOR

CROSS REFERENCE TO RELATED APPLICATION

The present application is based on and claims priority from Japanese Patent Applications 2000-239918 filed Aug. 8, 2000 and 2001-144937, filed May 15, 2001, the contents of which are incorporated herein by reference.

BACKGROUND OF THE INVENTION

1. Field of the Invention

The present invention relates to a vehicle AC generator and a voltage regulator thereof.

2. Description of the Related Art

Although a field coil is not supplied with field current, an armature winding of a vehicle AC generator generates a small output voltage signal if a rotor of the generator rotates because of residual magnetic flux of pole cores mounted in the rotor. U.S. Pat. No. 5,376,876 discloses a voltage regulator in which terminal voltage of an armature winding of an AC generator is compare with a staircase wave-form to detect rotation of the rotor.

If leak current flows from the outside of a high DC potential into the armature winding while the field coil is not supplied with field current, the output terminal of the armature winding is biased by the high DC potential. Accordingly, the output voltage of the armature winding is too high to be compared with the staircase wave-form, and the comparator does not provide a normal output signal as long as the leak current flows into the armature winding.

In order to solve the above problem, WO99/07064 proposes an AC generator in which the output voltage of an armature winding is compared with a variable threshold value of a window comparator to detect rotation of a rotor.

However, if leak current flows into the armature winding from the outside of a high DC voltage, it is impossible to know the level of the DC voltage because contact resistance is not fixed and widely changes. It is necessary, but impossible to provide an infinite number of threshold levels to detect a signal of the leak current.

Mechanism of the DC biasing when the leak current flows is discussed below with reference to FIGS. 8–14.

Figure 8:
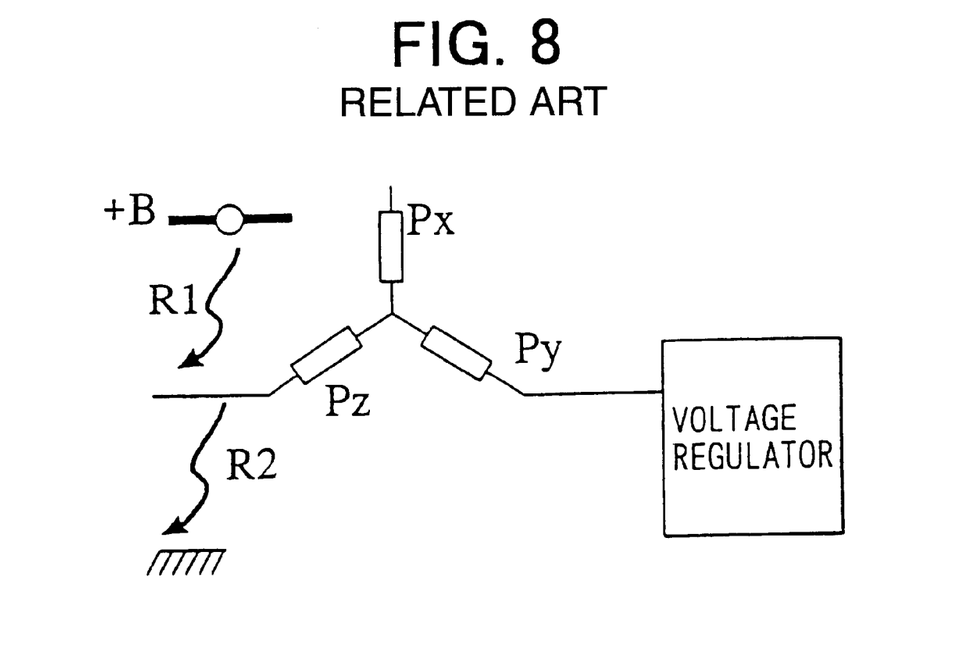
FIG. 8 is a schematic diagram illustrating a phase winding of a conventional AC generator.

Firstly, FIG. 8 schematically shows a case in which leak current flows into a Z-phase winding for generating phase voltage Pz that is not used as a rotation signal. If contact resistance between the output terminal of the Z-phase winding and +B potential of, for example a positive cooling fin of the full-wave rectifier is R1 and contact resistance between the output terminal of the Z-phase winding and a ground, for example a housing is R2, the contact resistances R1 and R2 changes widely according to foreign material such as salt water, mud water, or its dried product, crystals, rust or the like.

Figure 9:
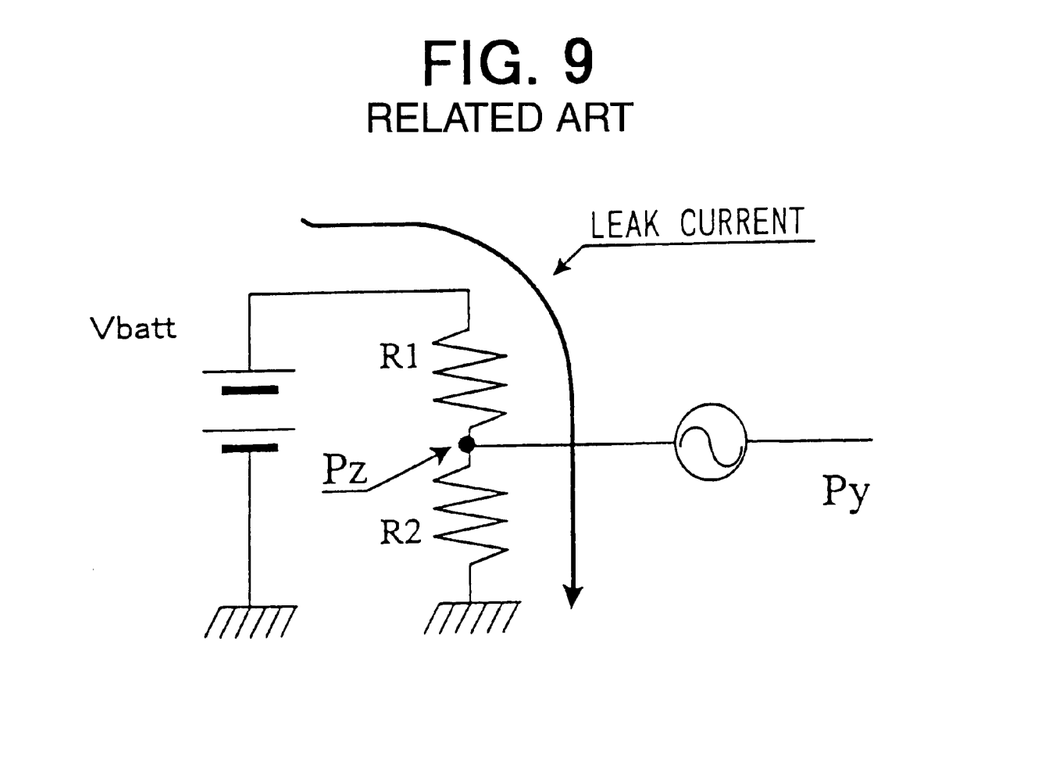
FIG. 9 is an equivalent circuit diagram of phase windings shown in FIG. 8 when a leak current flows.

FIG. 9 shows an equivalent circuit diagram when leak current flows. The potential or terminal voltage Pz of the terminal of the Z-phase winding is expressed as follows: Vbatt·R2/(R1+R2). Since the amounts of the resistances R1 and R2 are not fixed, the potential Pz of the terminal is not fixed.

Figure 10A:
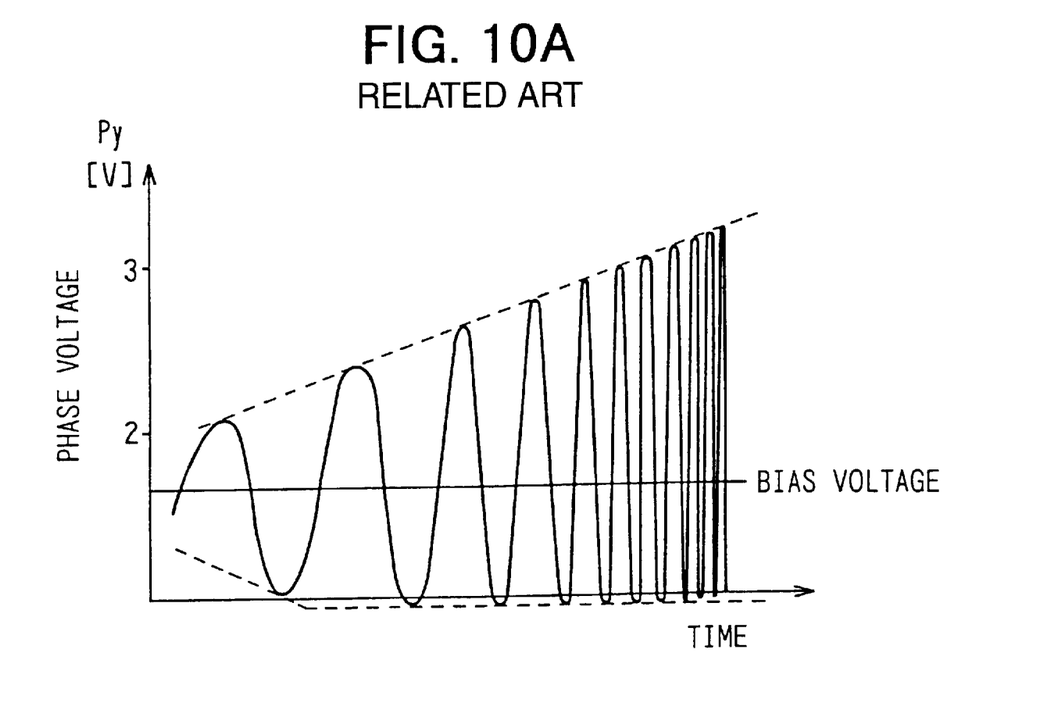
FIG. 10A is a graph showing relationship between time and rotation speed of a rotor.
Figure 10B:
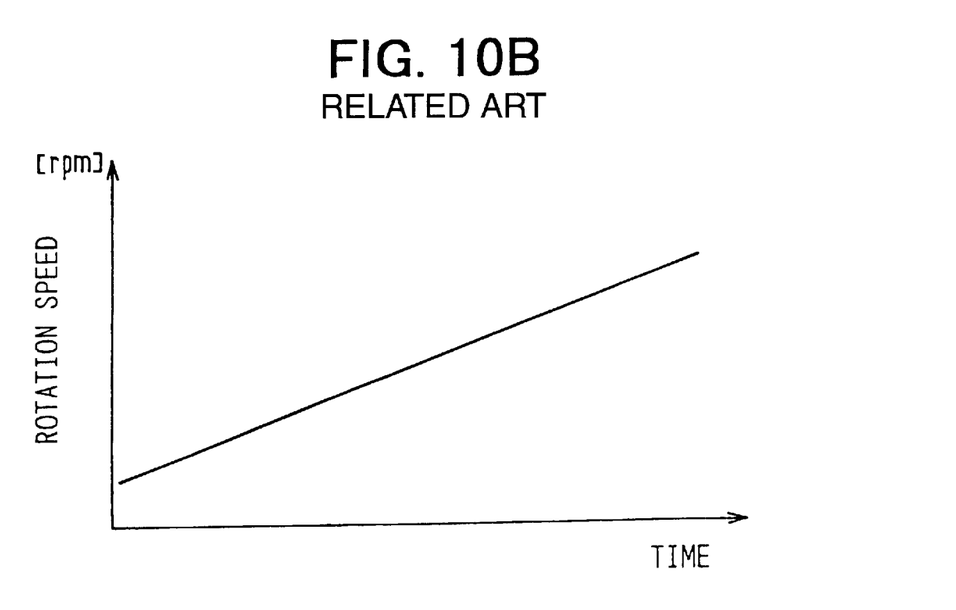
FIG. 10B is a graph showing a change in the phase voltage of the phase windings that correspond to FIG. 10A.

When an engine is started and the rotor of the AC generator is rotated, the terminal of the Z-phase winding is applied a voltage that alternates and changes according to rotation speed of the rotor from a value expressed by Vbatt·R2/(R1+R2). (as shown in FIG. 10).

In WO99/07064, although the threshold value of the window comparator is variable, only a limited number of threshold values are provided. It takes a time to detect all the variable DC bias voltage signals, and it is too late when the signal is found to correspond to one of the threshold values that were provided. Therefore, it is impossible to make the AC generator generate power concurrently when the engine starts.

Figure 11:
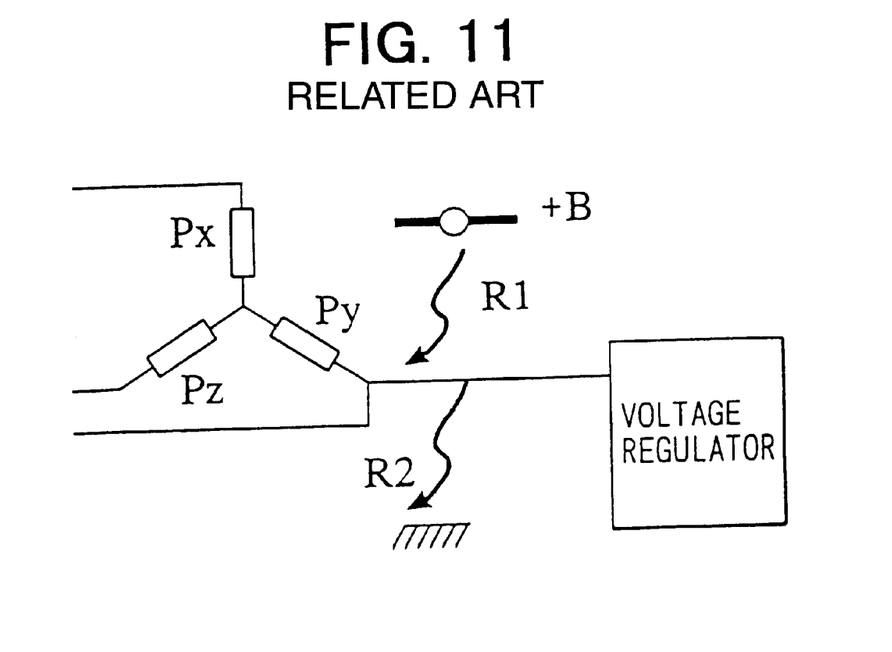
FIG. 11 is a schematic diagram illustrating a phase winding of a conventional AC generator to be detected.
Figure 12:
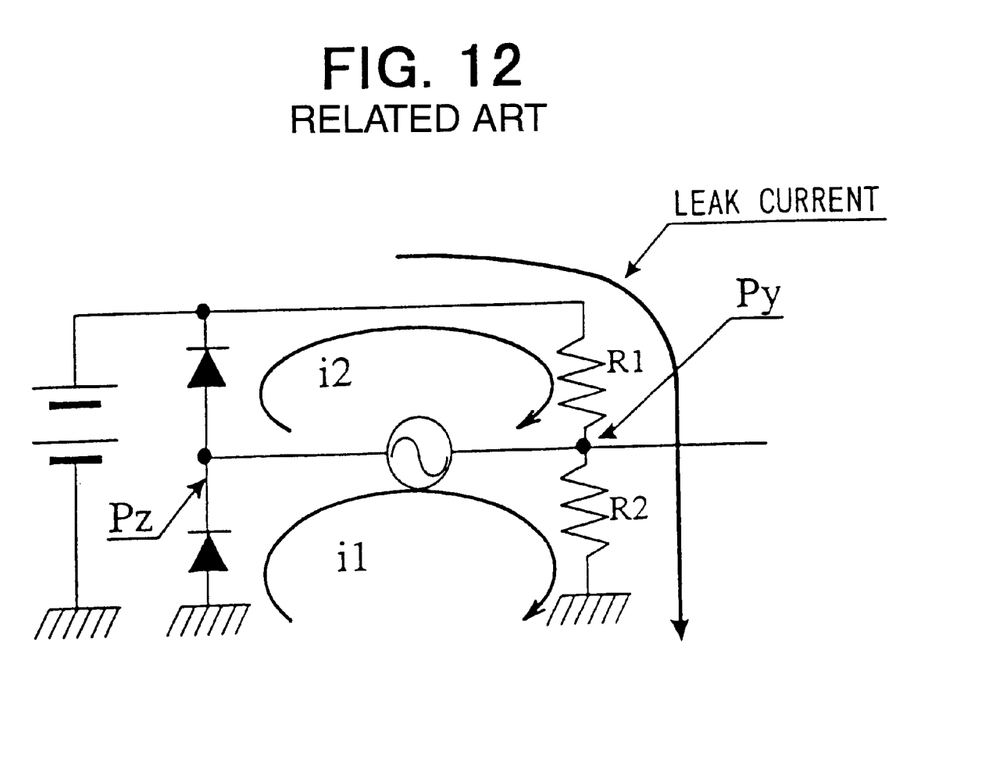
FIG. 12 is an equivalent circuit diagram of phase windings shown in FIG. 11 when leak current flows.
Figure 13A:
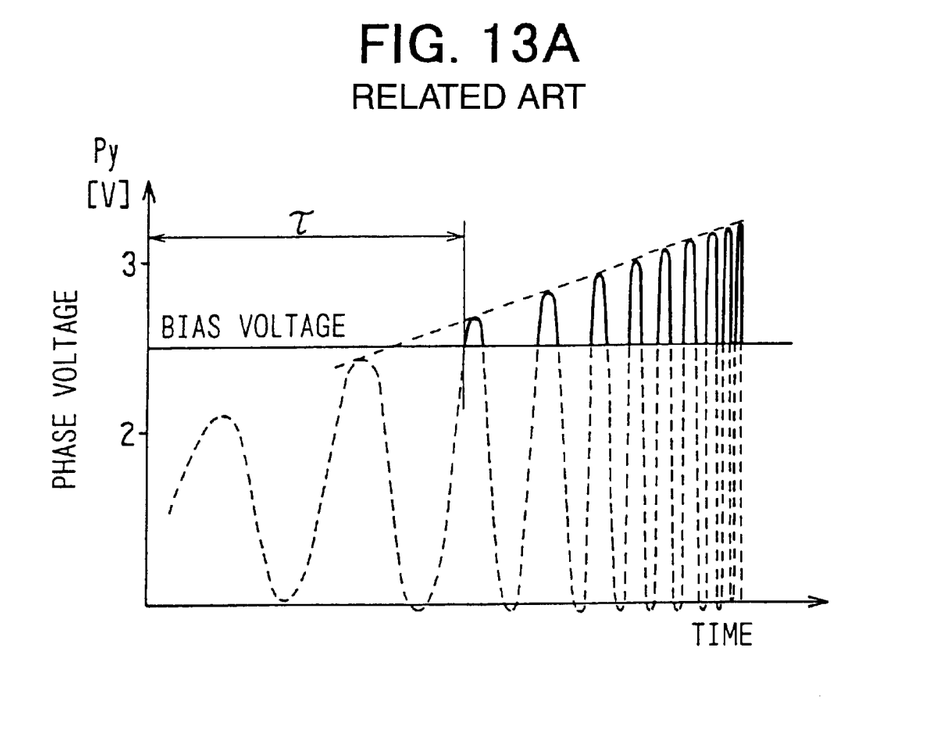
FIG. 13A is a graph showing relationship between time and rotation speed of a rotor.
Figure 13B:
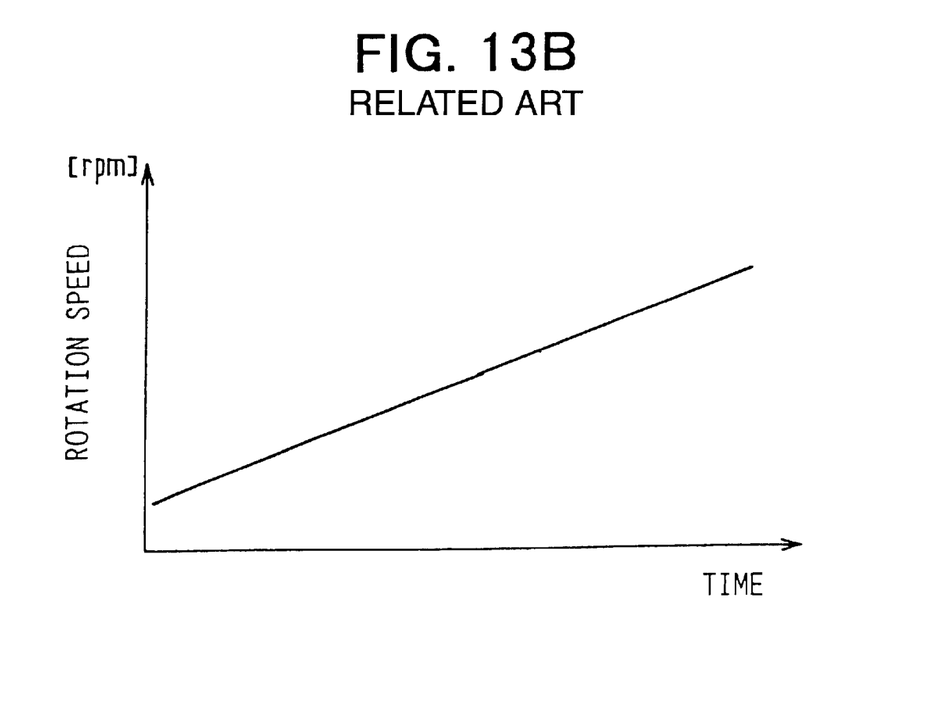
FIG. 13B is a graph showing a change in phase voltage that corresponds to FIG. 13A.

Further, if leak current flows into a Y-phase winding for generating phase voltage Py that is detected and used for the rotation signal, as shown in FIG. 11 (or equivalent circuit is shown in FIG. 12), the potential thereof is fixed to the value expressed by Vbatt·R2/(R1+R2). As a result, it is impossible to detect the potential of other X and Z-phase windings unless the voltage Px or Pz becomes higher than Vbatt or lower than the ground voltage. That is, if the generated voltage is lower than the DC bias voltage, the generated voltage levels of the X-phase and Z-phase windings are masked by the DC bias voltage (as indicated by broken lines in FIG. 13). Therefore, it takes a delay time τ to detect the generated voltage. (as shown in FIG. 13).

The delay time τ becomes the longest when the DC bias voltage becomes as high as a half of the terminal voltage of the vehicle battery, as hereafter described in more detail.

If the DC bias voltage becomes lower than a half of the terminal voltage of the vehicle battery, in other words, if the contact resistance R1 is larger than the contact resistance R2, the voltage Px or Pz of the X-phase or Z-phase winding alternately changes, with the DC bias voltage applied to the Y-phase winding being the center of the amplitude. If the voltage of the bias voltage is lower than a half of the battery terminal voltage, the phase voltages Px and Pz become the ground voltage faster than they become the battery terminal voltage. If the Z-phase voltage Pz becomes the ground voltage, a diode connected to the Z-phase winding passes signal current i1, so that the signal voltage becomes higher than the bias voltage. If the phase voltage Px becomes the ground voltage, a diode connected to the X-phase winding, likewise, passes signal current, as shown in FIG. 13A.

Figure 14A:
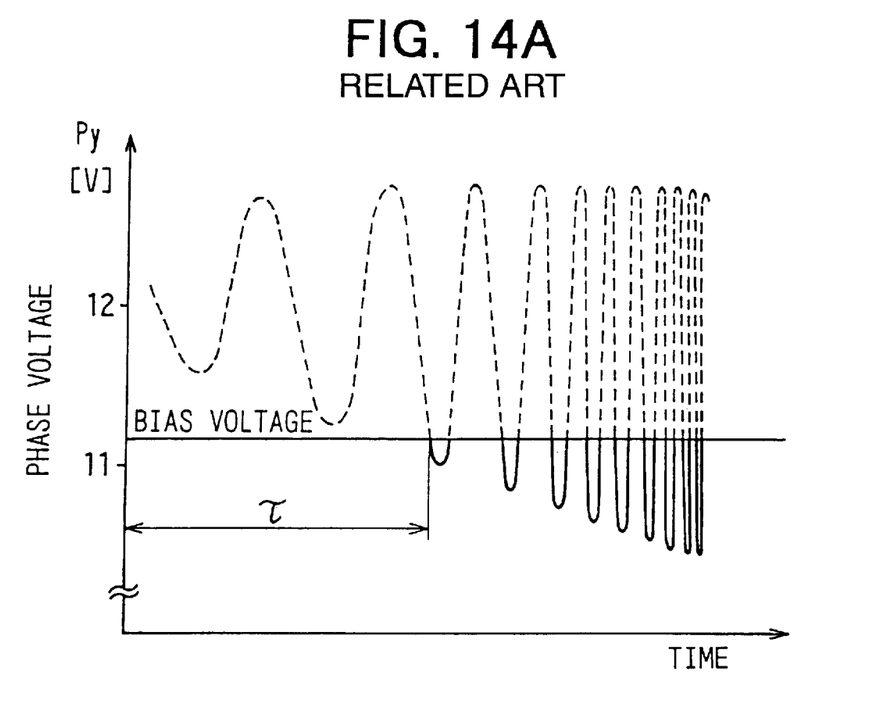
FIG. 14A is a graph showing relationship between time and rotation speed of a rotor.
Figure 14B:
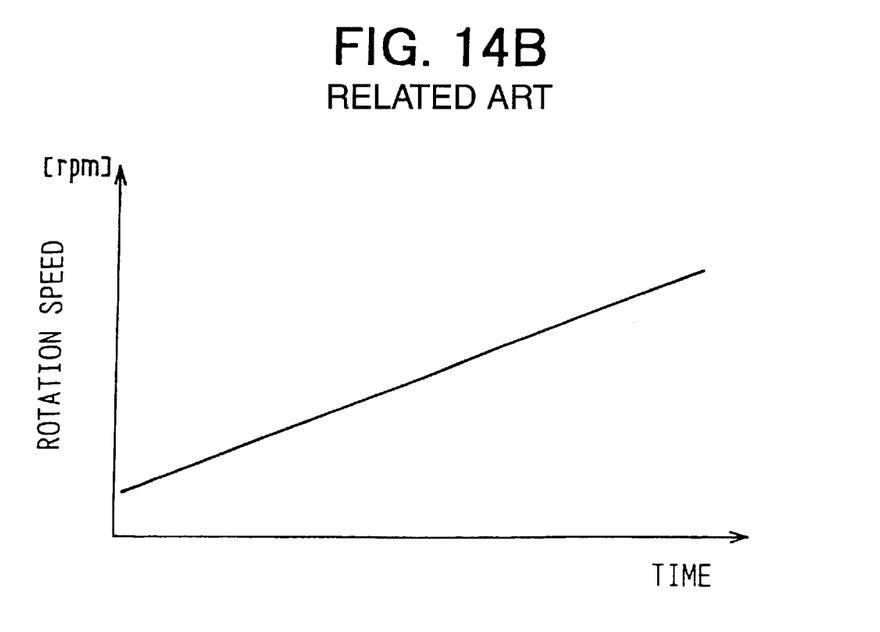
FIG. 14B is a graph showing a change in the phase voltage that corresponds to FIG. 14A.

On the other hand, if the DC bias voltage is higher than a half of the terminal voltage of the vehicle battery, in other words, if the contact resistance R1 is smaller than the contact resistance R2, the phase voltage Px or Pz alternately changes, with the bias voltage being the center of the amplitude. If the bias voltage is higher than a half of the battery terminal voltage, the phase voltages Px and Pz become the battery terminal voltage faster than they become the ground voltage. If the phase voltage Px becomes the battery terminal voltage, a diode connected to the X-phase winding passes signal current i2, so that the signal voltage becomes lower than the bias voltage, as shown in FIG. 14A.

Therefore, if the bias voltage applied to the Y-phase winding becomes as high as a half of the battery terminal voltage due to leak current, it takes the longest time for the phase voltages Px and Pz of the X-phase and Y-phase windings to become 0 V or the battery terminal voltage. That is, if an amount of the leak current is very large, it takes a long time to generate the rotation signal to be detected.

JP-A-3-215200 and PCT National Publication 8-503308 disclose control circuits in which terminal voltages of two phase windings are detected to thereby detect leak current. However, it is necessary to insert two terminals of the armature winding into the control circuit, which may become complicated in structure and increase in the number of joints of wires, resulting in lowering the reliability of the control circuit.

In the control circuit disclosed in JP-A-3-215200, a voltage difference between the terminals of two phase windings is detected in a voltage level that floats from the ground. Therefore, it is necessary to provide a specific comparator with a complicated supply source if such a floating voltage is to be compared with a reference voltage. Moreover, when the alternator starts generation, excessively high voltage may be applied to the comparator. Therefore, it is necessary to provide various protecting means for the comparator, resulting in a large size of the control circuit.

SUMMARY OF THE INVENTION

The present invention is to provide a voltage regulator of a vehicle AC generator that can surely detect a voltage signal from a terminal of a multi-phase armature winding.

In order to attain the above object, a voltage regulator of a vehicle AC generator according to a main feature of the invention includes means for detecting phase voltage of an armature winding, and a comparator for comparing phase voltage with a variable threshold level signal that varies according to the phase voltage. Even if leak current takes place and DC bias voltage is applied to the armature winding, a binary pulse signal can be surely formed so that the start of the rotation can be surely detected without delay. Accordingly, no exclusive signal line for detecting turning-on of a key switch is necessary.

A pulse detecting means for detecting the number of the pulses of the output signal of the comparator or frequency thereof may be provided. The AC generator is operated if the pulse detecting means detects the number or frequency to be the same as or larger than a predetermined level. Therefore, the signal can be processed digitally at a high speed, so that the rotation can be detected without delay by a compact integrated circuit.

The variable threshold level may be an electric signal that corresponds to one of the maximum voltage and the minimum voltage of the phase voltage. The variable threshold level can be formed by a positive peak hold circuit or a negative peak hold circuit.

The variable threshold level signal may be an electric signal that corresponds to any value between the maximum voltage and the minimum voltage of the phase voltage. In this case, the variable threshold value signal can be formed by combining a positive or negative peak hold circuit and a voltage dividing resistors. Further, the DC bias voltage due to the leak current can be detected at any case.

The variable threshold level signal may cross the phase voltage twice in a cycle of the phase voltage while the rotor is rotating. Therefore, the digitalized binary output pulse signal of the comparator can be surely formed. The variable threshold level signal may be a signal corresponds to a mean value of the phase voltage. Therefore, the variable threshold value signal can be formed easily by an integration circuit or the like.

The frequency of the output pulse of the comparator may be equal to the frequency of the phase voltage. Therefore, the frequency of the phase voltage, which is caused by rotation of the rotor, can be accurately detected. In other words, the rotation speed of the rotor can be accurately detected.

The voltage regulator may further includes a second comparator for comparing the phase voltage with a reference value, and the field current is supplied to the field coil for a predetermined period to increase the phase voltage when the second comparator reverses the output signal thereof.

Therefore, even if a small signal generated by residual magnetic flux can not be detected due to the leak current appearing in the phase winding that is detected, the signal is amplified by supplying field current to have a voltage level sufficient to be detected.

The phase voltage detecting means may include a first resistor connected between the armature winding and the negative terminal of a vehicle battery, a second resistor that has much lower resistance than the first resistor and connected, together with a switching means, in parallel with the first resistor. If the switching means is closed especially in a case that leak current flows in the phase winding whose terminal voltage is detected as the rotation signal, the terminal voltage can be lowered. Therefore, the delay time until a signal is increased to an amount to be detected can be reduced.

Further, if the detected phase voltage becomes higher than a predetermined voltage level, the switching means is opened. Therefore, power generated in the armature winding is prevented from being wasted by the second resistor.

The switching means may be a MOSFET that is easy to mount in a circuit. Moreover, the signal current can be supplied not only from the winding to the negative terminal of the battery, but also from the negative terminal of the battery to the winding. Therefore, the rotation can be detected even if the contact resistance varies widely.

The predetermined period may be longer than a period during which the field coil is supplied with field current so that the output voltage of the armature winding becomes as high as about a half of a nominal vehicle battery voltage. That is, the field current is supplied until the signal is generated even in the case that leak current takes place and the output voltage of the armature winding is fixed to be as high as a half of a nominal voltage of the vehicle battery. Therefore, the signal can be surely detected. Accordingly, the rotation of the rotor can be detected whenever any leak current flows.

The voltage regulator may cut the field current for a period after the field current is supplied to the field coil and before the field current is supplied to the field coil for a next period. Therefore, the field current is prevented from being continuously supplied as long as the leak current flows.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

The invention is described with reference to the appended drawings hereafter.

Figure 1:
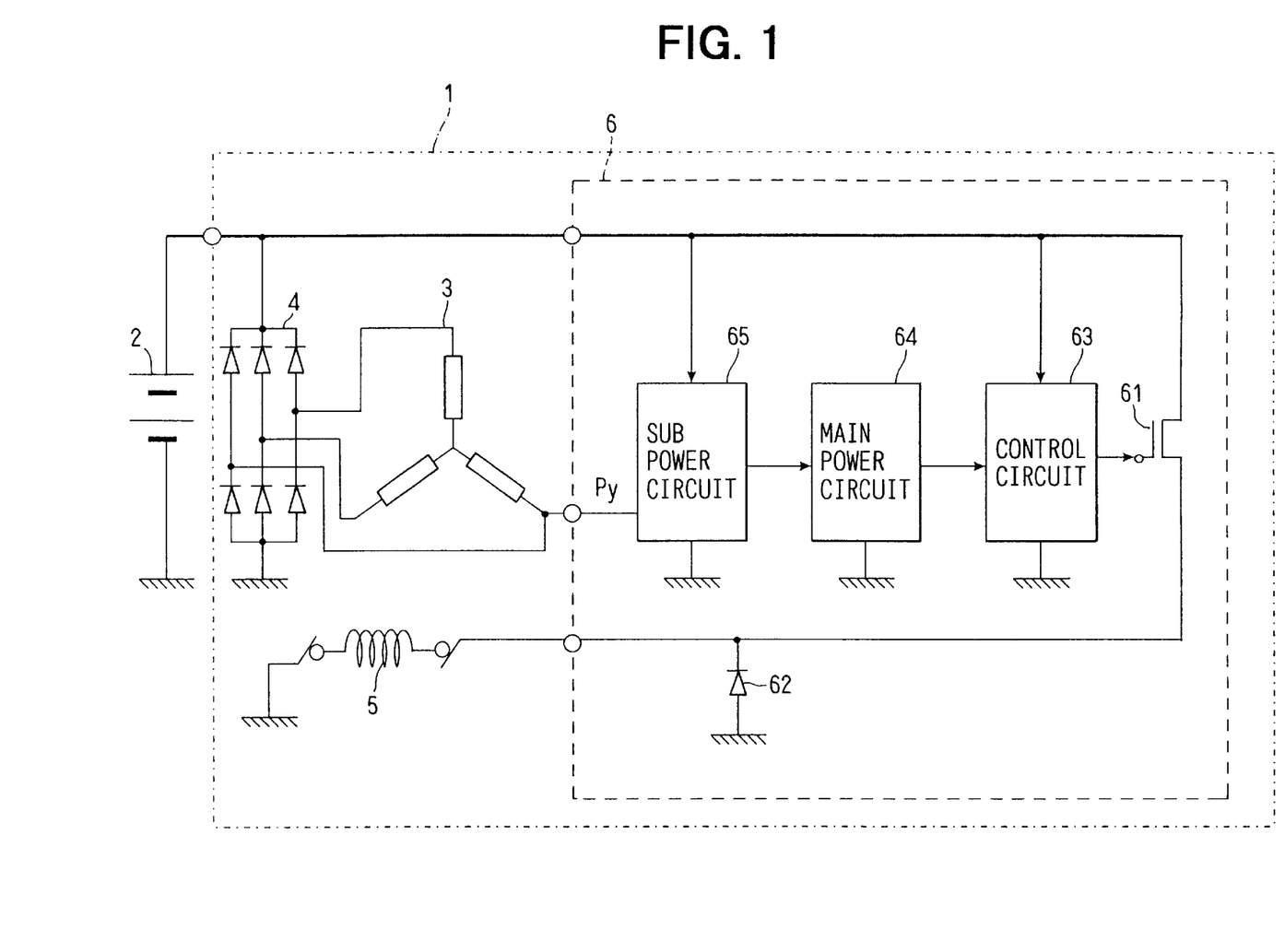
FIG. 1 is a block diagram illustrating a structure of the invention.
Figure 4:
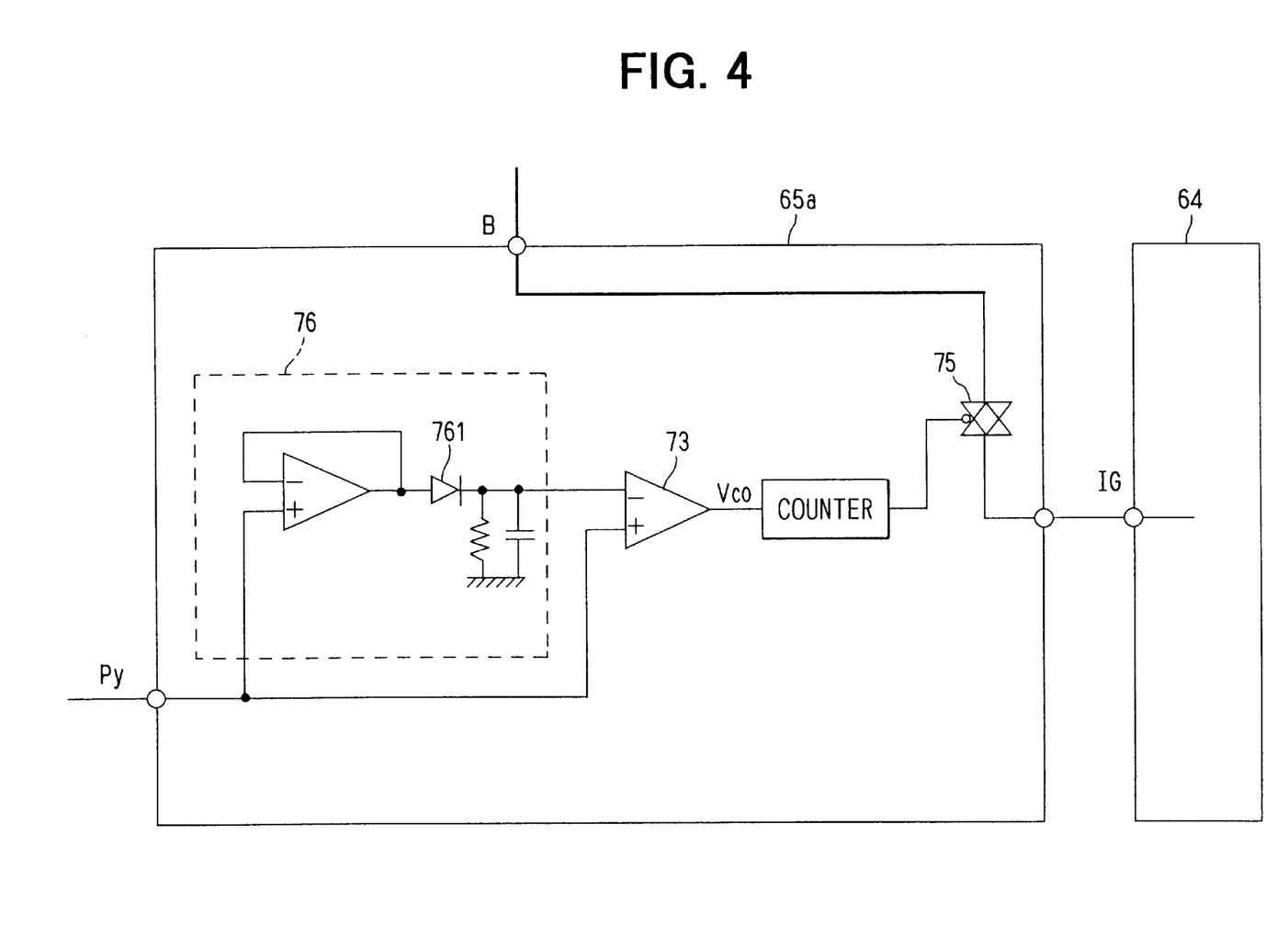
FIG. 4 is a diagram illustrating a variation of the sub-power circuit according to the first embodiment.

A voltage regulator according to a first embodiment of the invention is described with reference to FIG. 1, which shows an alternator 1, through FIG. 4.

The alternator 1 is connected to a vehicle battery 2. The alternator 1 is comprised of a three-phase armature winding 3, a full-wave rectifier unit 4 connected to respective phase windings of the three-phase armature winding 3, a field coil 5 mounted in a rotary magnetic pole core (not shown) for providing a rotary magnetic field to be supplied to the respective phase windings, and a voltage regulator 6 for controlling the output voltage of the armature winding 4 at a prescribed voltage level by controlling field current supplied to the field coil 5.

The voltage regulator 6 is comprised of a power transistor 61 which switches on and off the field current supplied to the field coil 5, a flywheel diode 62 for passing the field current when the power transistor 61 is turned off, a voltage control circuit 63, a main power circuit 64, and a sub-power circuit 65.

The voltage control circuit 63 monitors the output voltage of the full-wave rectifier unit 4 and generating a signal that drives the power transistor 61 so that the output voltage can be controlled at a prescribed level. The main power circuit 64 supplies power to the voltage control circuit 63 to keep the operation thereof. The sub-power circuit 65 detects a terminal voltage Py of a Y-phase winding of the armature winding 3 and generates a signal for driving the main power circuit when it detects rotation of the rotor.

Figure 2:
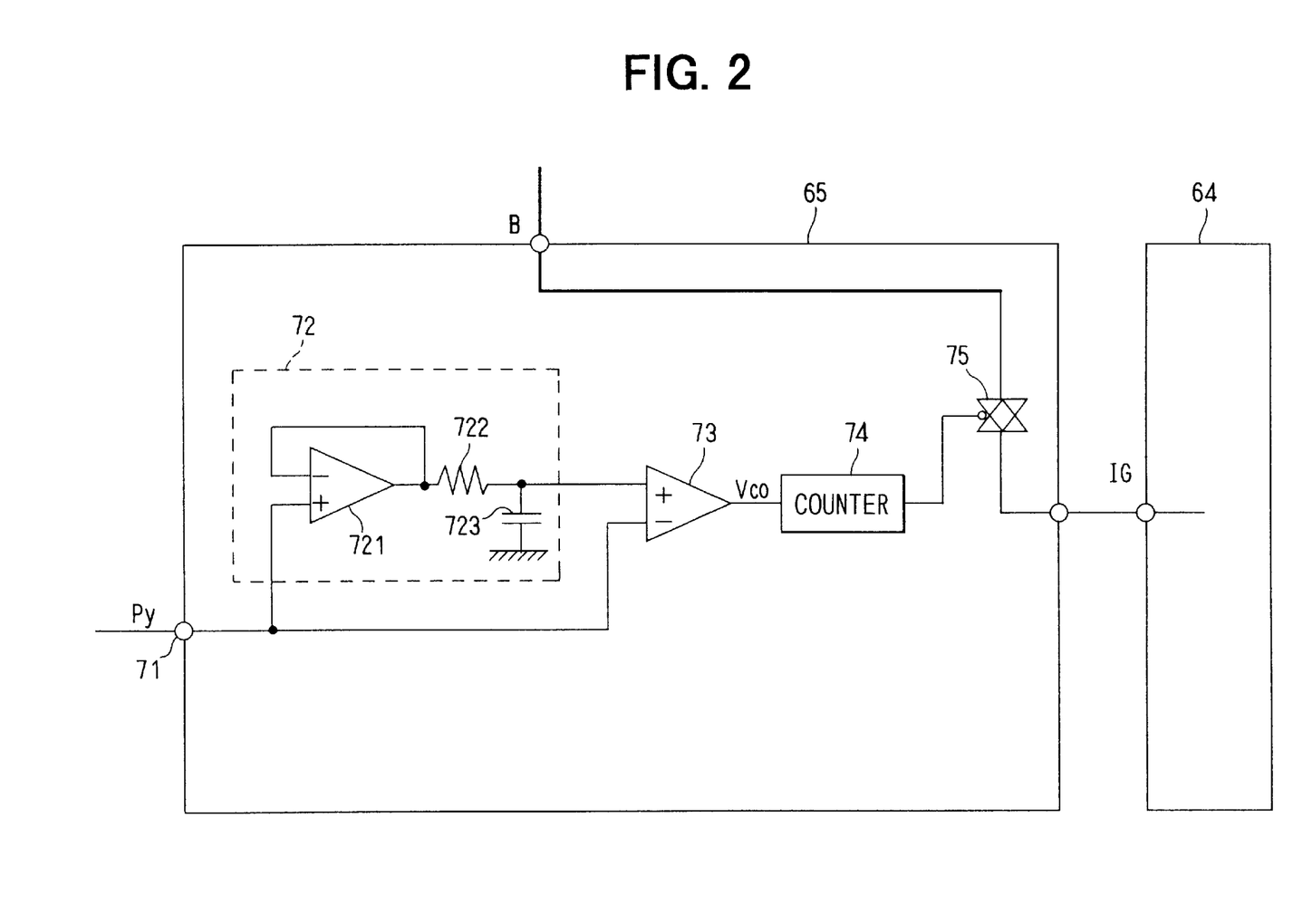
FIG. 2 is a diagram illustrating a sub-power circuit of the first embodiment.

As shown in FIG. 2, the sub-power circuit 65 is comprised of an input terminal 71 to which the phase voltage Py of the Y-phase winding is applied, an integration circuit 72 for providing the mean value of the Y-phase voltage Py, a voltage follower 721, a resistor 722 and a capacitor 723, a comparator 73, a counter circuit 74 and an analog switch 75. The comparator 73 compares the phase voltage Py with the output signal of the integration circuit 72 and provides a binary pulse signal. The counter circuit 74 counts the number of the pulses of the pulse signal of the comparator 73 and reverses when the number of the pulses becomes a predetermined number. The analog switch 75 supplies electric power to the main power circuit 64.

When the rotor of the alternator 1 starts rotation, the residual magnetic flux of the magnetic poles crosses the armature winding 3 to generate AC voltage, and the phase voltage Py of the Y-phase winding is applied to the sub-power circuit 65.

The sub-power circuit 65 provides a mean value of the Y-phase voltage at the integration circuit 72. Both the Y-phase voltage and the mean value thereof are inputted to the comparator 73, so that the comparator provides an output pulse signal. The number of pulses of the output pulse signal depends on the rotation speed. Therefore, if the rotation speed is high, the number of pulses per unit time becomes high. On the other hand, if the rotation speed is low, the number of the pulses per unit time is low. That is, the rotation speed of the rotor can be detected by counting the pulses. If the number of the pulses is larger than a predetermined number, it is judged that the rotor rotates at a normal operation speed. Then the counter circuit reverses, so that the analog switch is closed to maintain operation of the main power circuit.

Figure 3A:
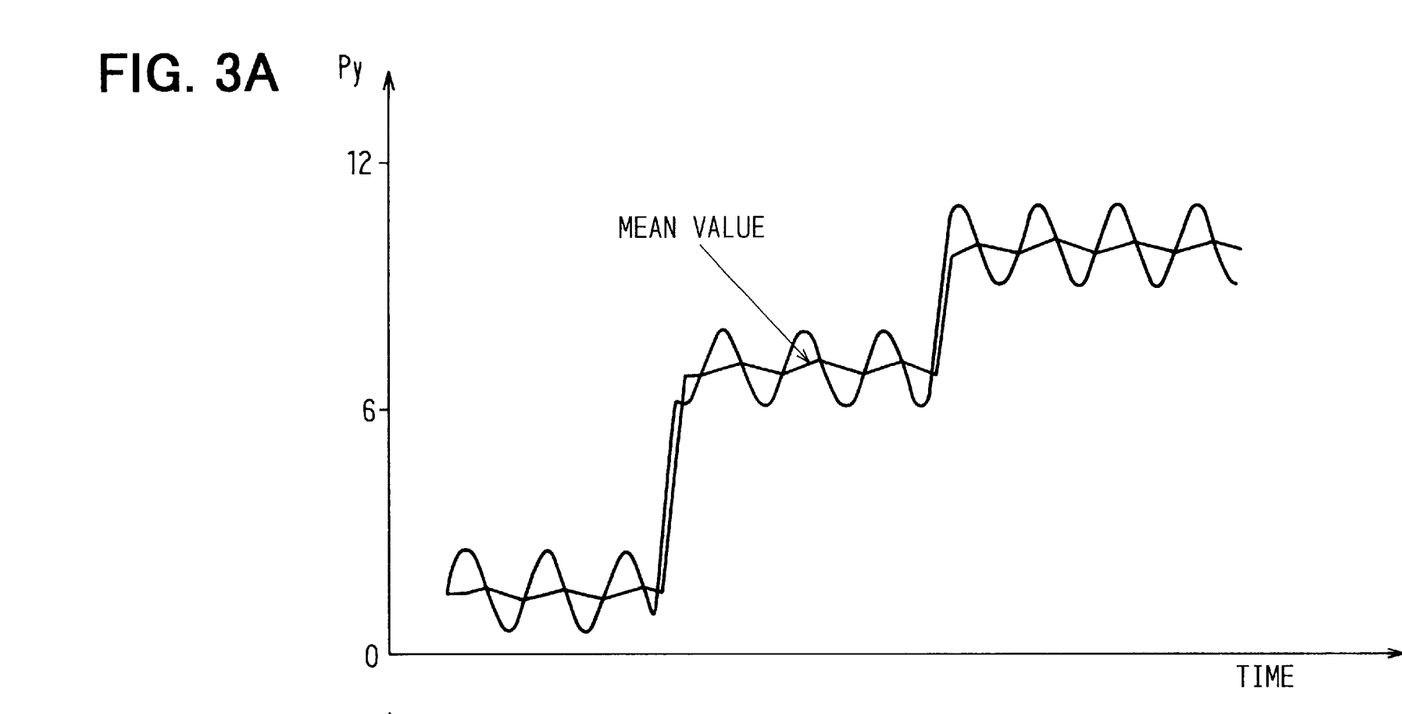
FIG. 3 is a timing chart illustrating operation of the first embodiment.
Figure 3B:
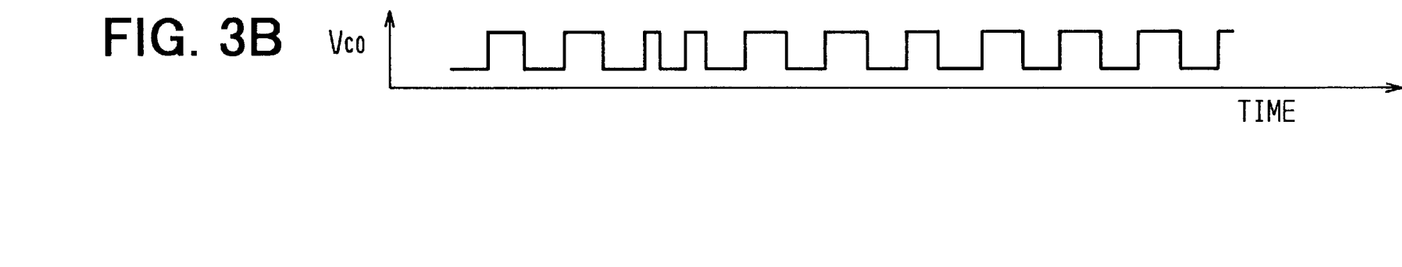

If leak current flows in the armature winding, DC bias voltage is added to the Y-phase voltage. That is, the mean value of the Y-phase voltage that is provided by the integration circuit 72 is equal to the DC bias voltage caused by the leak current. Therefore, even if the DC bias voltage can not be detected directly, the comparator 73 can compares both the input signals thereof and provide the output pulse signal Vco whenever the phase signal Py is applied to the terminal 71, as shown in FIGS. 3A and 3B.

Figure 5A:
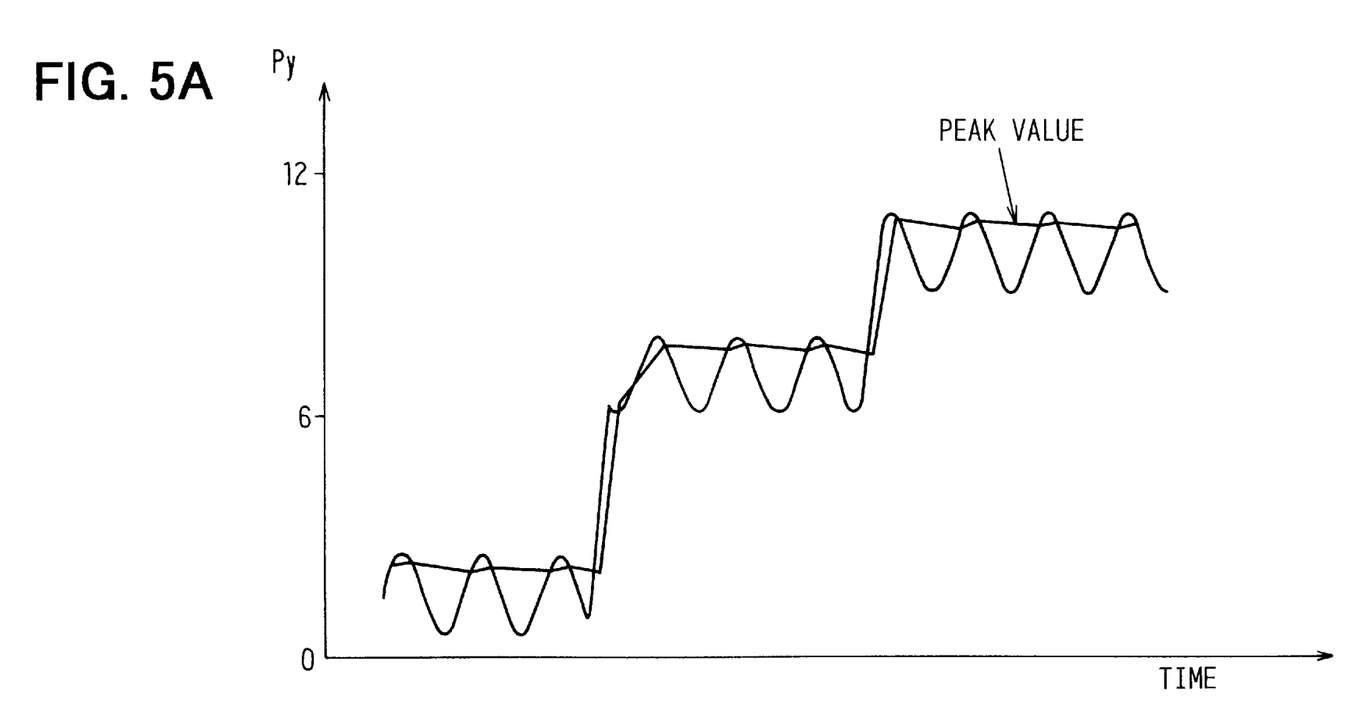
FIG. 5 is a timing chart illustrating operation of the variation of the first embodiment.
Figure 5B:
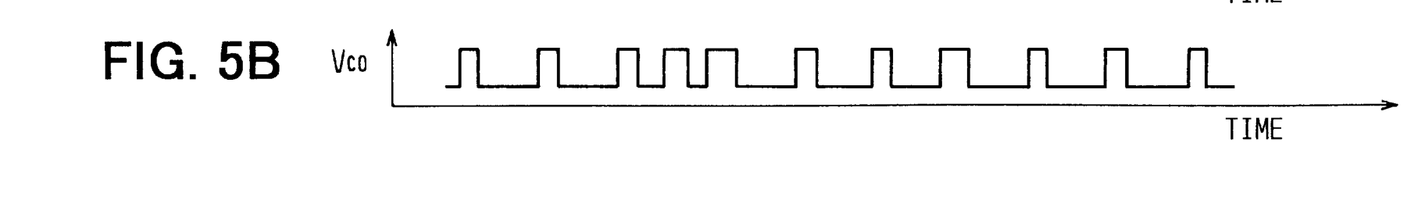

A variation 65a of the sub-power circuit 65 according to the first embodiment of the invention is described with reference to FIG. 4 and FIGS. 5A and 5B.

This sub-power circuit 65a has a peak hold circuit 76 for detecting the peak values of the Y-phase voltage instead of the integration circuit 72. The peak hold circuit 76, which has a time constant of a CR circuit, can not detect a complete envelope of the phase voltage. In other words, because of this feature, the Y-phase voltage Py and the output signal of the peak hold circuit 76 cross each other, so that the comparator can provide the pulse signal Vco at the output terminal thereof, as shown in FIGS. 5A and 5B. Other operation is the same as the operation of the first embodiment.

If the polarity of a diode 761 of a peak-hold circuit 76 is reversed, the negative peak value of the fluctuation, or the minimum value can be detected, instead of the positive peak value or the maximum value, in a well-known manner.

Further, a difference between the maximum value and the minimum value is detected, and this voltage signal is divided into a suitable value to provide a medium threshold value between the peak value and the minimum value.

Figure 6:
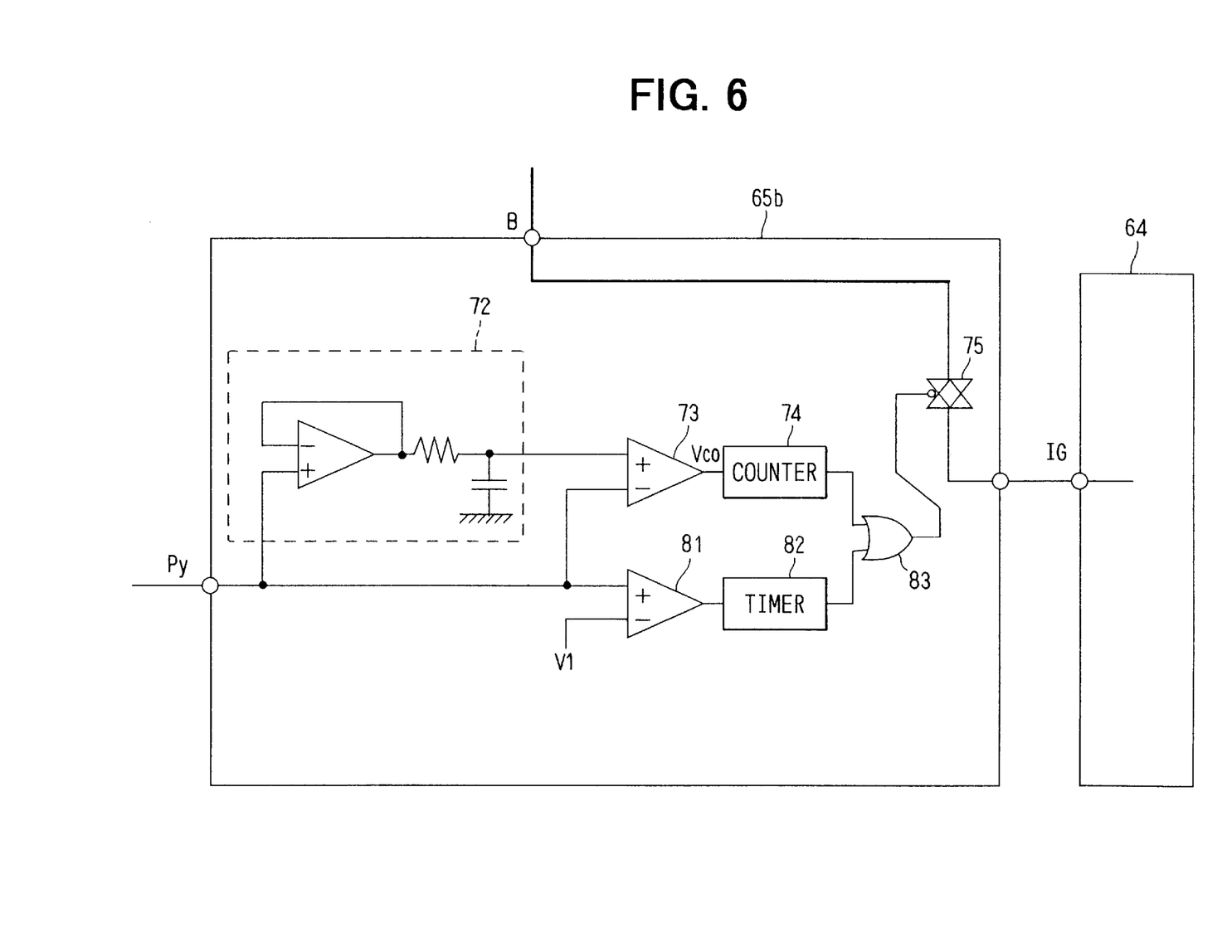
FIG. 6 is a sub-power circuit according to a second embodiment.

A voltage regulator according to a second embodiment of the invention is described with reference to FIG. 6.

A sub-power circuit 65b of the voltage regulator 6 according to the second embodiment is equipped with a series circuit of a second comparator 81 and a timer circuit 82. The Y-phase voltage of the Y-phase winding is compared with a voltage V1. After the comparator 81 reverses, the analog switch 75 is turned on to drive the power circuit 64 for a limited short period. If the rotor of the alternator 1 rotates at this moment, the phase voltage Py of the Y-phase winding rises up instantly because the field current is supplied to the field coil, so that generation can be detected very easily. If the number of the pulses Vco supplied from the comparator 73 is larger than a predetermined value, the AC generator immediately starts normal generation.

On the other hand, if the rotor does not rotate, it is presumed that the comparator reverses because of the DC bias voltage caused by the leak current. In this case, the phase windings do not generate AC voltage even if the field current is supplied to the field coil. Therefore, the comparator 73 does not provide the pulse signal, and the analog switch turns off after such short period. If there is a certain interval before the next input signal applied to the comparator 81, the vehicle battery can be prevented from discharging.

Thus, the time lag of the signal caused by the leak current can be eliminated by supplying the field current thereby to amplify the signal.

Moreover, because the increase of the terminal voltage of the Y-phase winding due to the leak current can be distinguished from the increase of the phase voltage Py of the Y-phase winding, the main power source is prevented from operating without control.

Figure 7:
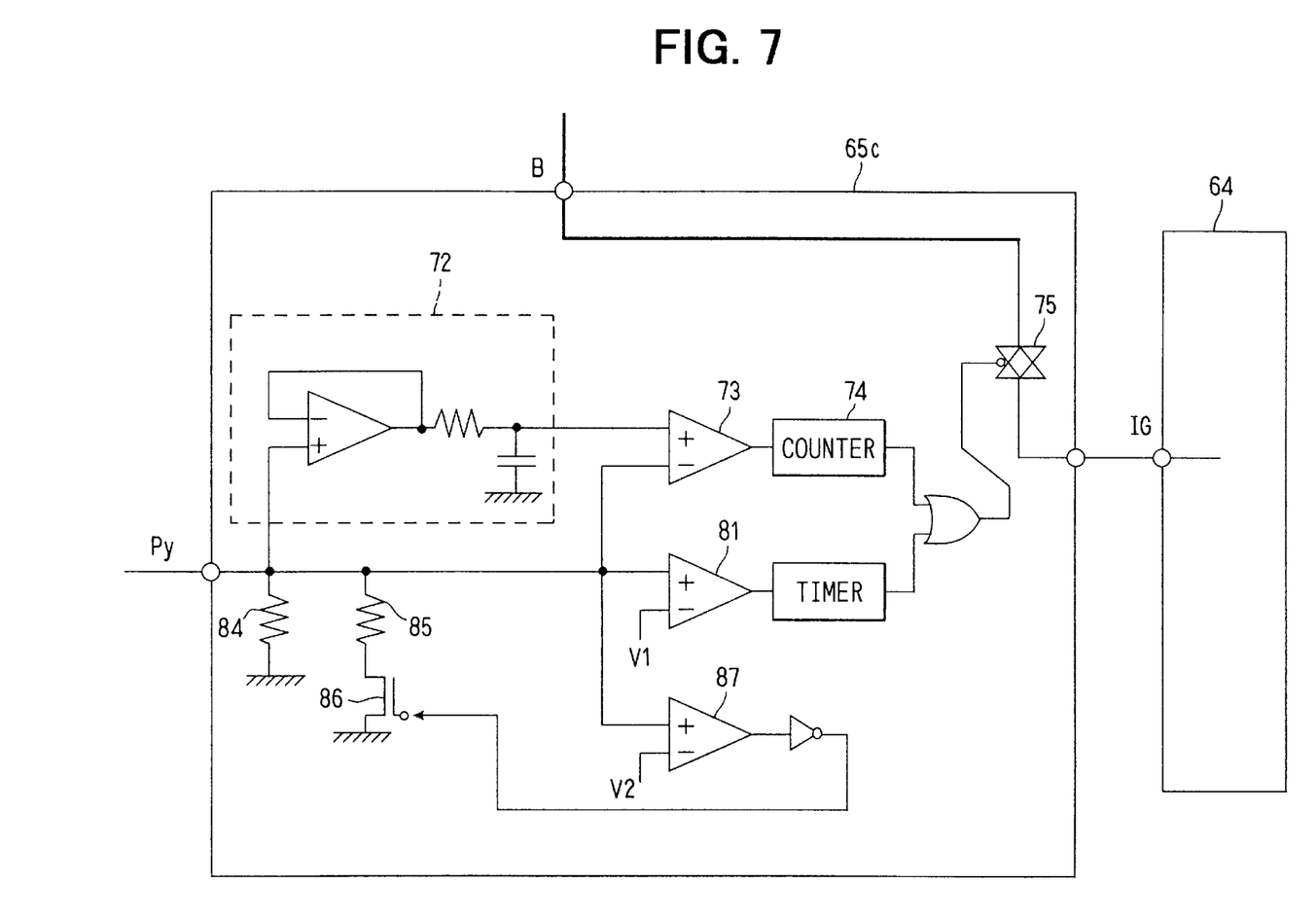
FIG. 7 is a diagram illustrating a sub-power circuit according to a third embodiment.

A voltage regulator 6 according to a third embodiment of the invention is described with reference to FIG. 7.

A first resistor 84 is connected between the terminal of a sub-power circuit 65c and the ground, and a second resistor 85, which has a much smaller resistance R3 than the first resistor, is connected in parallel with the first resistor 84. A switching element 86 is connected between the second resistor 85 and the ground. The resistance of the first resistor 84 is about 100 times as many as, or more than, the resistance of the second resistor 85.

The sub-power circuit 65c has a third comparator 87 that compares the Y-phase voltage with a second voltage level V2 that is higher than the first voltage level V1. The switching element 86 is turned on until the third comparator 87 reverses.

The third comparator 87 does not reverse until the Y-phase voltage becomes as high as the second voltage level V2. When it does not reverse, the switching element 86 is turned on. If leak current flows, the DC bias voltage of the Y-phase winding is reduced from a high level expressed by Vbatt·R2/(R1+R2) to a low level expressed by Vbatt·R3/(R1+R3), since the resistor having much smaller resistance R3 than R2 is connected. As stated before, if the DC bias voltage is low, the detection delay is improved since the time lag of the signal generated when the rotor rotates becomes shorter.

In order to prevent the output current of the armature winding 3 from flowing to the ground through the resistor 85 even if the field current is supplied and the phase voltage Py of the Y-phase winding increases, the switch 86 is turned off immediately after the terminal voltage of the Y-phase winding reaches V2.

Further, in order to make sure the generation of the phase voltage Py, field current is supplied for a period so that the output voltage of the armature winding becomes as high as a half of the battery terminal voltage.

If the field current is stopped after a certain time, the input terminal of the sub-power circuit 65c, to which the phase voltage Py is applied, is raised by the leak current to be higher than the first voltage level V1. The field current may be otherwise supplied again, and the battery power may be wasted due to discharge. However, this is prevented by providing an interval before the next Py-phase voltage is detected.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A voltage regulator of a vehicle AC generator including a rotor having a plurality of magnetic poles, a field coil for polarizing said plurality of magnetic poles, an armature having an armature core with a plurality of phase windings for generating AC voltage under the influence of a rotating magnetic field provided by said rotor and a full-wave rectifier for converting said AC voltage into DC voltage, said voltage regulator comprising:

first means for providing a variable threshold level representing a DC component of phase voltage of one of said phase windings, a comparator for comparing the phase voltage of said one of said phase windings with the variable threshold level to provide a pulse signal that is proportional to a rotation speed of said rotor, and second means for energizing said field coil when the number of pulses of said pulse signal becomes larger than a predetermined number.

2. The voltage regulator of a vehicle AC generator as claimed in claim 1, wherein said variable threshold level corresponds to one of the maximum voltage and the minimum voltage of said phase voltage.

3. The voltage regulator of a vehicle AC generator as claimed in claim 1, wherein said variable threshold level corresponds to a value between the maximum voltage and the minimum voltage of said phase voltage.

4. The voltage regulator of a vehicle AC generator as claimed in claim 3, wherein said variable threshold level crosses said phase voltage twice in a cycle of said phase voltage when said rotor rotates.

5. The voltage regulator of a vehicle AC generator as claimed in claim 4, wherein said variable threshold level corresponds to a mean value of said phase voltage.

6. The voltage regulator of a vehicle AC generator as claimed in claim 1, wherein said frequency of said output pulse of said comparator is equal to the frequency of said phase voltage.

7. The voltage regulator as claimed in claim 1, further comprising a second comparator for comparing said phase voltage with a reference value, wherein said field current is supplied to said field coil for a predetermined period to increase said phase voltage when said second comparator reverses the output signal thereof.

8. The voltage regulator of a vehicle AC generator as claimed in claim 7, wherein said first means comprises a first resistor connected between the output terminal of said phase winding and the negative terminal of a vehicle battery, a series circuit of a second resistor having much lower resistance than said first resistor and a switching means connected in parallel with said first resistor, wherein said switching means is opened if said phase voltage is detected to be higher than a redetermined voltage.

9. The voltage regulator of a vehicle AC generator as claimed in claim 8, wherein said switching means comprises a MOSFET.

10. The voltage regulator as claimed in claim 7, wherein said predetermined period is equal to or longer than a period during which said field coil is supplied with field current so that said phase voltage becomes as high as about a half of a nominal vehicle battery voltage.

11. The voltage regulator as claimed in claim 7, wherein said field current is cut for a period that is longer than said predetermined period after said field current is supplied to said field coil for said predetermined period and before said field current is supplied to said field coil for a next predetermined period.

12. A voltage regulator of a vehicle AC generator including a rotor having a plurality of magnetic poles and a field coil for polarizing said plurality of magnetic poles, an armature having an armature core with a plurality of phase windings for generating AC voltage under the influence of a rotating magnetic field provided by said rotor and a full-wave rectifier for converting said AC voltage into DC voltage, said voltage regulator comprising:

an input terminal connected to one of said phase windings;

a sub-power circuit, connected to said input terminal, for detecting phase voltage of one of said phase windings and generating a rotation signal;

a main power circuit, connected to said sub-power circuit, for supplying power;

a field current switching element connected to said field coil;

a voltage control circuit, connected to said main power circuit for monitoring the output voltage of said full-wave rectifier and generating a control signal that controls said field current switching element so that said output voltage of said full-wave rectifier can be controlled at a prescribed level; wherein said sub-power circuit comprises:

a comparator having a first input terminal connected to said input terminal and a second input terminal, said comparator providing an output pulse signal;

first means, connected to said second input terminal, for providing a variable threshold level representing a DC component of said phase voltage; and second means for energizing said field coil when the number of pulses of said pulse signal becomes larger than a predetermined number.

13. A voltage regulator of a vehicle AC generator including a rotor having a field coil and a plurality of magnetic poles, an armature having a plurality of phase windings and a full-wave rectifier connected to said phase windings, said voltage regulator comprising:

a phase-voltage-input terminal connected to one of said phase windings;

a phase-voltage-detection circuit, connected to said phase voltage input terminal, for detecting phase voltage of said one of said phase windings and generating a rotation signal if it detects said phase voltage;

a field current switching element connected to said field coil;

a voltage control circuit for monitoring the output voltage of said full-wave rectifier and generating a control signal that controls said field current switching element so that said output voltage of said full-wave rectifier can be controlled at a prescribed level; wherein said phase-voltage-detection circuit comprises:

a comparator having a first input terminal connected to said phase-voltage-input terminal and a second input terminal, said comparator providing an output pulse signal a threshold circuit, connected to said second input terminal, for providing a variable threshold level representing a DC component of said phase voltage, and means for energizing said field coil when the number of pulses of said pulse signal becomes larger than a predetermined number.

14. The voltage regulator as claimed in claim 13, wherein said phase-voltage-detection circuit comprises an integration circuit having an output terminal connected to said first input terminal, for providing a mean value of said phase voltage.

15. The voltage regulator as claimed in claim 13, wherein said phase-voltage-detection circuit comprises a peak hold circuit having an output terminal connected to said second input terminal of said comparator, for detecting peak values of said one of phase voltage.

16. The voltage regulator as claimed in claim 14, wherein said phase-voltage-detection circuit further comprises a second comparator having a first input terminal connected to said phase-voltage-input terminal and a timer circuit 82 connected in series with said second comparator for providing a certain interval before a next phase voltage.

17. The voltage regulator as claimed in claim 16, wherein said phase-voltage-detection circuit further comprises a second resistor, a switching element connected in series with said second resistor, a third comparator having a first input terminal connected to said phase-voltage-input terminal for controlling said switching element.

* * * * *